(12) United States Patent
Englund et al.

(10) Patent No.: US 8,790,442 B2
(45) Date of Patent: Jul. 29, 2014

(54) SYSTEM AND METHOD FOR PRODUCING METALLIC IRON

(75) Inventors: David J. Englund, Bovey, MN (US); Mark Schlichting, Crawfordsville, IN (US); John Meehan, Conway, AR (US); Jeremiah Crouch, Conway, AR (US); Logan Wilson, Hot Springs, AR (US)

(73) Assignee: Nu-Iron Technology LLC, Charlotte, NC (US)

( * ) Notice: Subject to any disclaimer, the term of this patent is extended or adjusted under 35 U.S.C. 154(b) by 182 days.

(21) Appl. No.: 13/499,152

(22) PCT Filed: Sep. 29, 2010

(86) PCT No.: PCT/US2010/050743
§ 371 (c)(1),
(2), (4) Date: Apr. 20, 2012

(87) PCT Pub. No.: WO2011/041431
PCT Pub. Date: Apr. 7, 2011

(65) Prior Publication Data
US 2012/0192679 A1    Aug. 2, 2012

Related U.S. Application Data

(60) Provisional application No. 61/246,739, filed on Sep. 29, 2009.

(51) Int. Cl.
*C21B 15/00* (2006.01)

(52) U.S. Cl.
USPC .............................................. 75/484; 75/503

(58) Field of Classification Search
USPC ................................. 75/484, 503
See application file for complete search history.

(56) References Cited

U.S. PATENT DOCUMENTS

| 4,923,391 A | 5/1990 | Gitman |
| 5,567,224 A | 10/1996 | Kundrat |
| 5,730,775 A | 3/1998 | Meissner et al. |
| 5,865,875 A | 2/1999 | Rinker et al. |
| 5,873,925 A | 2/1999 | Rinker et al. |
| 5,951,740 A | 9/1999 | Sarma et al. |

(Continued)

OTHER PUBLICATIONS

Figueroa et al., "Advances in CO2 Capture Technology—The U.S. Department of Energy's Carbon Sequestration Program", International Journal of Greenhouse Gas Control 2 (2008) 9-20.

(Continued)

*Primary Examiner* — George Wyszomierski
*Assistant Examiner* — Tima M McGuthry Banks
(74) *Attorney, Agent, or Firm* — Hahn, Loeser & Parks LLP; Arland T. Stein

(57) ABSTRACT

A method of production of metallic iron nodules comprises assembling a hearth furnace having a moveable hearth comprising refractory material and having a conversion zone and a fusion zone, providing a hearth material layer comprising carbonaceous material on the refractory material, providing a layer of reducible material comprising and iron bearing material arranged in discrete portions over at least a portion of the hearth material layer, delivering oxygen gas into the hearth furnace to a ratio of at least 0.8:1 ponds of oxygen to pounds of iron in the reducible material to heat the conversion zone to a temperature sufficient to at least partially reduce the reducible material and to heat the fusion zone to a temperature sufficient to at least partially reduce the reducible material, and heating the reducible material to form one or more metallic iron nodules and slag.

54 Claims, 5 Drawing Sheets

(56) References Cited

U.S. PATENT DOCUMENTS

| | | | |
|---|---|---|---|
| 5,989,019 | A | 11/1999 | Nishimura et al. |
| 6,015,527 | A | 1/2000 | Kamei et al. |
| 6,117,387 | A | 9/2000 | Sarma et al. |
| 6,129,777 | A | 10/2000 | Fuji et al. |
| 6,270,551 | B1 | 8/2001 | Rinker et al. |
| 6,284,017 | B1 | 9/2001 | Kamei et al. |
| 6,368,379 | B1 | 4/2002 | Tateishi et al. |
| 6,379,421 | B1 | 4/2002 | Salinas-Fernandez et al. |
| 6,390,810 | B1 | 5/2002 | Rinker et al. |
| 7,032,526 | B2 | 4/2006 | Tetsumoto et al. |
| 7,572,316 | B2 | 8/2009 | Harada et al. |
| 8,021,460 | B2 * | 9/2011 | Bleifuss et al. ............ 75/484 |
| 2004/0163493 | A1 | 8/2004 | Harada et al. |
| 2008/0023338 | A1 | 1/2008 | Stoots et al. |
| 2009/0158892 | A1 | 6/2009 | Govindaswami |
| 2009/0160107 | A1 | 6/2009 | Tetsumoto et al. |
| 2009/0175753 | A1 | 7/2009 | Iwasaki et al. |
| 2009/0229414 | A1 | 9/2009 | Bleifuss et al. |
| 2010/0031776 | A1 | 2/2010 | Englund et al. |
| 2010/0107818 | A1 | 5/2010 | Bleifuss et al. |

OTHER PUBLICATIONS

Li et al., "Impurity Impacts on the Purification Process in Oxy-Fuel Combustion Based CO2 Capture and Storage System", Appl Energ (2008), doi: 10.1016/j.apenergy.2008.05.006.

Liu et al., Simultaneous Easy CO2 Recovery and Drastic Reduction of SOx and NOx in O2/CO2 Coal Combustion with Heat Recirculation, Fuel 82 (2003) 1427-1436.

Lu, "Fundamentals and Practicality of the Development of a New and Better Ironmaking Process", AISTech 2004 Proceedings—vol. I (2004).

Lu et al., "The Evolution of Ironmaking Process Based on Coal-Containing Iron Ore Agglomerates", ISIJ International, vol. 41, No. 8, pp. 807-812 (2001).

* cited by examiner

SYSTEM AND METHOD FOR PRODUCING METALLIC IRON

This patent application is a national stage of International Application No. PCT/US2010/020743, filed Sep. 29, 2010 and claims priority to and the benefit of U.S. Provisional Application No. 61/246,739, filed Sep. 29, 2009.

GOVERNMENT INTERESTS

The present invention was made with support by the Department of Energy, Sponsor Award DE-FG36-05GO15185. The United States government has certain rights in the invention.

BACKGROUND AND SUMMARY

This invention relates to reduction of iron bearing materials such as iron ore to metallic iron nodules (known as "NRI").

Metallic iron has been produced by reducing iron oxide such as iron ores, iron pellets and other iron sources. Various such methods have been proposed so far for directly producing metallic iron from iron ores or iron oxide pellets by using reducing agents such as coal or other carbonaceous material. Such fusion reduction processes generally involve the following processing steps: feed preparation, drying, preheating, reduction, fusion/melting, cooling, product discharge, and metallic iron/slag product separation. These process steps result in direct reduction of iron bearing material to metallic iron nodules (NRI) and slag. Metallic iron nodules produced by these direct reduction processes are characterized by near total reduction, approaching 100% metal (e.g., about 96% or more metallic Fe). Percents (%) herein are percents by weight unless otherwise stated.

Unlike conventional direct reduced iron (DRI) product, the metallic iron nodule (NRI) product has little or no gangue and little or no porosity. NRI is substantially metallic iron product desirable for many applications, such as use in place of scrap in steelmaking by electric arc furnaces. Such metallic iron nodules may be made by processing beneficiated taconite iron ore, which may contain 30% oxygen and 5% gangue. In addition to advantages of the NRI product, there is less bulk to transport than with beneficiated taconite pellets or DRI, as well as a lower rate of oxidation and a lower porosity than DRI. In addition, generally, such metallic iron nodules are just as easy to handle as taconite pellets and DRI. Moreover, NRI is a more efficient and effective substitute for scrap in steel making by electric arc furnace (EAF) without extending heat times and increasing energy cost in making steel.

Various types of hearth furnaces have been described and used for direct reduction of metallic iron nodules (NRI). One type of hearth furnace used to make NRI is a rotary hearth furnace (RHF). The rotary hearth furnace is partitioned annularly into a drying/preheating zone, a reduction zone, a fusion zone, and a cooling zone, between the supply location and the discharge location of the furnace. An annular hearth is supported rotationally in the furnace to move from zone to zone carrying reducible material the successive zones. In operation, the reducible material comprises a mixture of iron ore or other iron oxide source and reducing material such as carbonaceous material, which is charged onto the annular hearth and initially subject to the drying/preheat zone. After drying and preheating, the reducible material is moved by the rotating annular hearth to the reduction zone where the iron ore is reduced in the presence of the reducing material, and then to the fusion zone where the reduced reducible material is fused into metallic iron nodules, using one or more heating sources (e.g., natural gas burners). The reduced and fused NRI product, after completion of the reduction process, is cooled on the moving annular hearth in the cooling zone to prevent reoxidation and facilitate discharge from the furnace. Another type of furnace used for making NRI is the linear hearth furnace such as described in U.S. Pat. No. 7,413,592, where similarly prepared mixtures of reducible material are moved on moving hearth sections or cars through a drying/preheating zone, a reduction zone, a fusion zone, and a cooling zone, between the charging end and discharging end of a linear furnace while being heated above the melting point of iron.

A limitation of these methods and systems of making metallic iron nodules has been their energy efficiency. The iron oxide bearing material and associated carbonaceous material generally had to be heated in a reduction furnace to about 2500° F. (about 1370° C.), or higher, to reduce the iron oxide and produce metallic iron nodules. The furnace generally required natural gas methane or propane to be burned to produce the heat necessary to heat the iron oxide bearing material and associated carbonaceous material to the high temperatures to reduce the iron oxide and produce a metallic iron material. Furthermore, the reduction process involved production of volatiles in the furnace that had to be removed from the furnace and secondarily combusted to avoid an environmental hazard, which added to the energy needs to perform the iron reduction. See, e.g., U.S. Pat. No. 6,390,810.

In the past, furnace systems for production of iron nodules heated by oxy-fuel burners had reduced efficiency due to loss of heat through the exhaust stack. Recovery of heat through preheating of oxygen and fuel entering the oxy-fuel burners has not been possible as oxygen gas and fuel sources contain too little mass to efficiently transfer heat from one location in the furnace to another, and tend to be more volatile when heated. Additionally, the oxy-fuel burners have produced flame temperatures resulting in internal furnace temperatures causing damage to the burner and the furnace refractory. We have found a method and reduction furnace system for making metallic iron nodules that reduces the energy consumption needed to reduce the iron oxide bearing material to produce metallic iron nodules more efficiently.

A method of production of metallic iron nodules is disclosed comprising the steps of assembling a hearth furnace having a moveable hearth comprising refractory material and having at least a conversion zone and a fusion zone, providing a hearth material layer comprising at least carbonaceous material on the refractory material, providing a layer of reducible material comprising a mixture of at least reducing material and reducible iron bearing material arranged in a plurality of discrete portions over at least a portion of the hearth material layer, delivering oxygen gas into the hearth furnace in the conversion and fusion zones to at a ratio of at least 0.7:1 pounds of oxygen to pounds of iron in the reducible iron bearing material to heat the conversion zone to a temperature sufficient to at least partially reduce the reducible material and to heat the fusion zone to a temperature sufficient to at least partially reduce the reducible material, and heating the layer of reducible material in the fusion zone to form from the discrete portions one or more metallic iron nodules and slag. As used herein, the ratio of pounds of oxygen gas to pounds of iron in the reducible iron bearing material is based on the overall amount of oxygen gas delivered to the conversion and fusion zones of the furnace, and the ratio of pounds of oxygen gas to pounds of iron in the reducible material may be more or less than the overall ratio in any particular location along the length of the conversion and fusion zones of the furnace as described below.

Alternatively, the ratio of pounds of oxygen to pounds of iron in the reducible material may be at least 0.8:1, 0.9:1, 1:1, 1.2:1, 1.5:1, or 1.7:1 based on oxygen delivered to the conversion and fusion zones of the furnace. The oxygen gas may be delivered to the conversion zone and the fusion zone through one or more oxygen lances or oxy-burners. The oxygen gas may be delivered through oxygen lances from a position less than 18 inches from the top of the interior of the hearth furnace and alternately or in addition through the oxy-burners positioned in the walls of the furnace housing in the conversion zone and the fusion zone.

The step of providing a layer of reducible material may include discrete portions being pre-formed briquettes or balls, or compacts made in situ.

The present method permits metallic iron nodules to be produced with little, if any, additional fuel such as natural gas, methane or propane after start-up of the furnace. The carbonaceous material in and surrounding the reducible material may be the only additional fuel source. In the method, the conversion zone may be heated to a temperature of at least 2350° F. (about 1290° C.), and the fusion zone may be heated to the temperature of at least 2550° F. (about 1400° C.). Additionally, a drying zone may be provided within or adjacent the hearth furnace, and the drying zone may be heated to a temperature between about 200-400° F. (about 90-200° C.). The hearth furnace may also include a cooling zone and/or a cooling zone outside the furnace downstream of the hearth furnace.

The method of production of metallic iron nodules may utilize a linear hearth furnace or a rotary hearth furnace.

The present method of making metallic iron nodules may include the additional step of providing an overlayer of coarse carbonaceous material over at least a portion of the layer of reducible material either before introduction into the furnace as described in PCT/US2007/074471, filed Jul. 26, 2007, or adjacent introduction of the heated reducible material to the fusion zone as described in Ser. No. 12/569,176, filed on Sep. 29, 2009, with this application. The coarse carbonaceous material is greater than 6 mesh in size and may have an average particle size greater than an average particle size of the hearth material layer carbonaceous material. The coarse carbonaceous material may be between 6 mesh and ½ inch in size.

If desired, the oxygen gas may be delivered to the conversion zone and the fusion zone through one or more oxygen lances such that the oxygen gas flow avoids impinging upon the coarse carbonaceous layer.

A stoichiometric amount of reducing material is the amount necessary for complete metallization and formation of metallic iron nodules from a predetermined quantity of reducible iron bearing material. At least a portion of the reducible material has a predetermined quantity of reducible iron bearing material and between about 80 percent and about 110 percent of the stoichiometric amount of reducing material necessary for complete iron reduction of the reducible iron bearing material, or metallization, where the iron bearing material includes waste material such as mill scale as described in U.S. Provisional Patent Application 61/146,455 filed Jan. 22, 2009. Alternatively, at least a portion of the reducible material has a predetermined quantity of reducible iron bearing material and between about 70 percent and about 90 percent of the stoichiometric amount of reducing material necessary for complete iron reduction of the reducible iron bearing material where the iron bearing material is magnetite and/or hematite.

The method may include the additional steps of heating the conversion zone to at a temperature sufficient to at least partially reduce the reducible material and the fusion zone to a temperature sufficient to at least partially reduce the reducible material by the combustion of at least one of the fuels selected from the group consisting of natural gas, methane, propane, fuel oil, and coal, commencing the step of delivering oxygen gas in a ratio of at least 0.8:1 0.9:1, 1:1, 1.2:1, 1.5:1, or 1.7:1 pounds of oxygen to pounds of iron in the reducible material, and substantially reducing if not stopping supply of the fuels in the conversion and fusion zones after initiating the step of delivering oxygen gas.

Alternatively, the method of producing metallic iron nodules may comprise the steps of assembling a hearth furnace having a moveable hearth comprising refractory material and having at least a conversion zone and a fusion zone, providing a hearth material layer comprising at least carbonaceous material on the refractory material, providing a layer of reducible material comprising a mixture of at least reducing material and iron bearing material arranged in a plurality of discrete portions over at least a portion of the hearth material layer, delivering oxygen gas into the hearth furnace in the conversion and fusion zones in a quantity sufficient to heat the conversion zone to a temperature sufficient to at least partially reduce the reducible material and to heat the fusion zone to at least 2650° F. (about 1450° C.), and heating the layer of reducible material to produce from the discrete portions one or more metallic iron nodules and slag.

The reducible iron bearing material may contain at least a material selected from the group consisting of mill scale, magnetite, hematite, and combinations thereof in the proportions as described above. The reducing material may contain at least a material or mixture of materials selected from the group consisting of, anthracite coal, coke, char, bituminous coal and sub-bituminous coal.

A method of production of metallic iron nodules is disclosed comprising the steps of assembling a hearth furnace having a moveable hearth comprising refractory material and having at least a conversion zone and a fusion zone, providing a hearth material layer comprising at least carbonaceous material on the refractory material, providing a layer of reducible material comprising at least reducing material and reducible iron bearing material arranged in a plurality of discrete portions over at least a portion of the hearth material layer, delivering oxygen gas in a ratio of at least 0.8:1 pounds of oxygen to pounds of iron in the reducible material and combustible gases other than air into the hearth furnace in the conversion and fusion zones to heat the conversion zone to a temperature sufficient to at least partially reduce the reducible material and to heat the fusion zone to a temperature sufficient to at least partially reduce the reducible material and in addition to produce a stack gas having a composition of at least 20% carbon dioxide, heating the layer of reducible material to form from the discrete portions one or more metallic iron nodules and slag, and processing the stack gas to produce a gas stream having a composition of at least 90% carbon dioxide by oxidizing carbon monoxide and hydrogen in the stack gas, treating the gas stream to remove at least one of sulfur-containing and halogen-containing compounds, and condensing any water vapor present in the gas stream.

The method may in addition comprise the step of capturing the carbon dioxide gas from the gas stream for use in a subsequent process. The subsequent process may be selected from a group consisting of precipitating carbonates, compressing the carbon dioxide gas to form liquid carbon dioxide and transporting the carbon dioxide gas through a pipeline to a second location.

BRIEF DESCRIPTION OF THE DRAWINGS

The following detailed description of embodiments of the present method can be best understood when read in conjunction with the following drawings, where like structure is indicated with like reference numerals and in which.

DETAILED DESCRIPTION OF THE DRAWINGS

Figure 1:
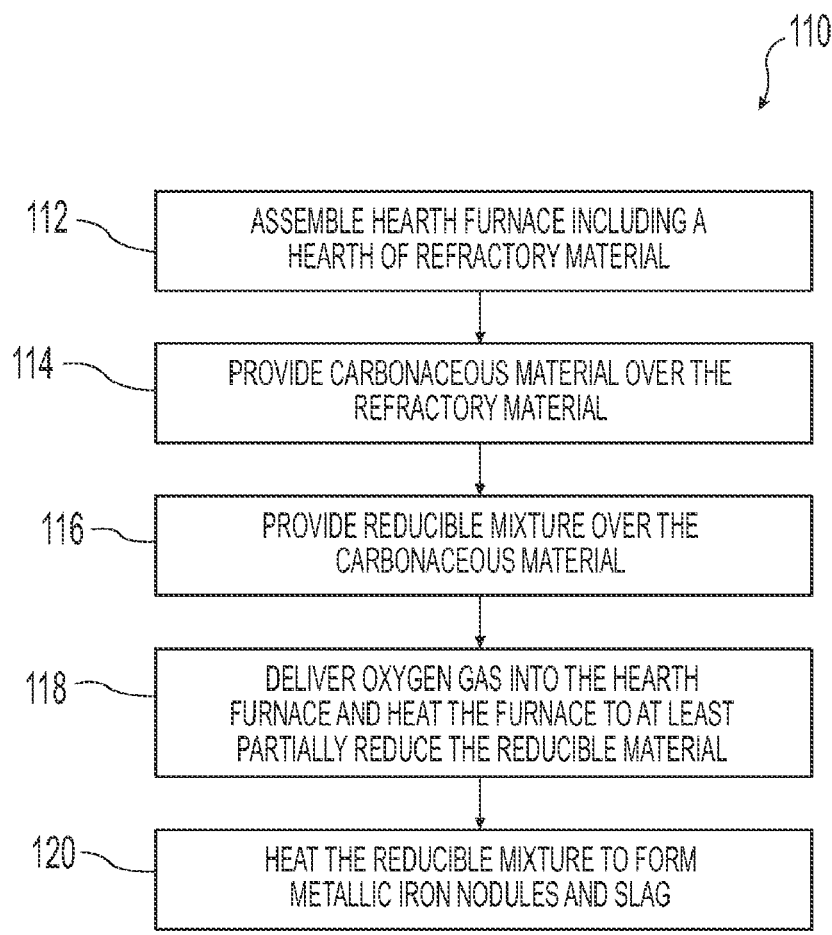
FIG. 1 is a block diagram of one or more general embodiments of a metallic iron nodule process.

FIG. 1 shows a block diagram of illustrative embodiments of a method 110 for making metallic iron nodules. The method 110 for making metallic iron nodules may be performed in the linear hearth furnace described with further reference to FIG. 2.

Figure 2:
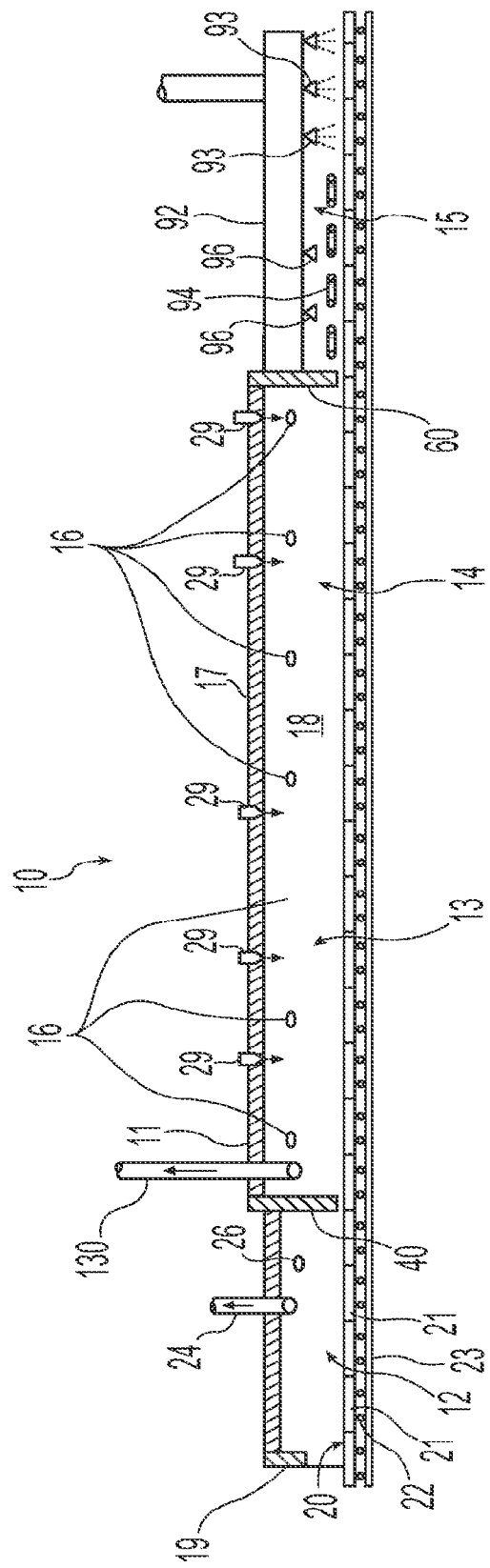
FIG. 2 is an elevation view illustrating a hearth furnace for producing metallic iron material and a method for producing same.

As shown in block 112 of FIG. 1 and FIG. 2, a hearth furnace 10 for producing metallic iron nodules directly from iron ore and other iron oxide sources is shown. The furnace 10 has a furnace housing 11 having a furnace roof 17 and side walls 18 internally lined with a refractory material suitable to withstand the temperatures involved in the metallic reduction carried out in the furnace, and a hearth 20. The hearth 20 may be any moving hearth suitable for use with the hearth furnace 10 operable for production of metallic iron nodules 63. Generally, the hearth 20 includes refractory material upon which reducible material to be processed (e.g., feed material) is received. The hearth 20 may be a hearth suitable for use in a rotary hearth furnace, a linear hearth furnace (e.g., as shown in FIG. 2), or any other furnace system operable for production of metallic iron nodules (NRI).

The refractory material lining the interior of the furnace may be, for example, refractory board, refractory brick, ceramic brick, or a castable refractory material. More than one refractory material may be used in different locations as desired. For example, a combination of refractory board and refractory brick may be selected to provide additional thermal protection for any underlying substructure. The hearth 20 may include a supporting substructure that moves the refractory material (e.g., a refractory lined hearth) forming hearth 20 through the furnace. The supporting substructure may be formed from one or more different materials, such as, for example, stainless steel, carbon steel, or other metals, alloys, or combinations thereof that have suitable high temperature characteristics for furnace operation.

The hearth furnace 10 is divided into at least a conversion zone 13 capable of providing a reducing atmosphere for reducible material, and a fusion zone 14 capable of providing an atmosphere to at least partially form metallic iron material. A drying/preheating zone 12 may be provided in or adjacent the furnace housing capable of providing a drying/preheating atmosphere for the reducible material. Additionally, a cooling zone 15 capable of providing a cooling atmosphere for reduced material containing metallic iron material may be provided in or adjacent the furnace housing immediately following the fusion zone 14. As noted, the cooling zone may be in the furnace housing 11, but as shown in FIG. 1, the cooling zone may be provided outside the furnace housing since the furnace housing is not necessary to its operation. Also as noted, the drying/heating zone may be provided inside or outside the furnace housing in desired embodiments.

In any case, the conversion zone 13 is positioned between the drying/preheating zone 12 and the fusion zone 14 and is the zone in which volatiles from the reducible material, including carbonaceous material, is fluidized, as well as the zone in which at least the initial reduction of metallic iron material occurs. The entry end of the hearth furnace 10, at the drying/preheating zone 12, may be at least partially closed by a restricting baffle 19 that may inhibit fluid flow between the outside ambient atmosphere and the atmosphere of the drying/preheating zone 12, yet provides clearance so as not to inhibit the movement of reducible material into the furnace housing 11. The baffle 19 may be made of suitable refractory material such as silicon carbide or a metal material if the temperatures are sufficiently low. The atmosphere in the hearth furnace 10 is typically maintained at a positive pressure compared to the ambient atmosphere to further inhibit fluid flow from the ambient atmosphere to the hearth furnace. The method of producing metallic iron nodules may include reducing the reducible material in the hearth furnace 10 to metallic iron nodules substantially free of air ingress from the surrounding environment.

Hearth 20 provided within the furnace housing 11 may comprise a series of movable hearth cars 21, which are positioned contiguously end to end as they move through the furnace housing 11. Hearth cars 21 may move on wheels 22 that typically engage rails 23. The upper portion of the hearth cars 21 are lined with a refractory material suitable to withstand the temperatures for reduction of the iron oxide bearing material into metallic iron nodules as explained herein. The hearth cars are positioned contiguously end to end to form hearth 20 and move through the furnace housing 11, so that the lower portions of the hearth cars are not damaged by the heat generated in the furnace as reduction of the iron oxide-bearing material into metallic iron proceeds. Alternatively, the hearth 20 may be a moving belt or other suitable conveyance medium provided with refractory material for the temperatures of the furnace atmospheres.

The hearth furnace may be linear as generally illustrated in FIG. 2. In this connection, the building in which the furnace is housed, or other considerations, may require that certain parts of the furnace be arcuate or at angles, to accommodate these needs. For these purposes, the hearth furnace is classified as linear if a part of its length, usually the conversion zone 13 and/or fusion zone 14, is substantially linear in the direction of travel of the hearth 20. Alternatively, the hearth furnace may be rotary, in which case the hearth sections or cars are pie-shaped or in the form of replaceable sections of a contiguous annular hearth rotatably supported in the furnace housing.

The zones of the furnace 10 are generally characterized by the temperature reached in each zone and the processing of reducible material in each zone. In the drying/preheating zone, moisture is driven off from the reducible material and the reducible material is heated to a temperature short of substantial fluidization of volatiles in and associated with the reducible material positioned on the hearth cars 21. The design is to reach in the drying/preheating atmosphere a temperature in the reducible material as high as reasonable for removing moisture and heating of the reducible material but below the temperature of substantial fluidization of the volatiles in the carbonaceous material in and associated with the reducible material. This temperature is generally in the range of about 200-40020 F. (about 90-200° C.), and is selected usually depending in part on the particular composition of the reducible material and the particular composition of carbonaceous material. One or more preheating burners 26 may be provided in the drying/preheating zone, for example, in the side walls of the furnace housing 11. The preheating burners 26 may be oxy-fuel burners or air/natural gas fired burners as desired, depending on the desired disposition of the stack gas from the drying/preheating zone and further processing of that stack gas.

The conversion zone 13 is characterized by heating the reducible material to drive off remaining moisture and most of the remaining volatiles in the reducible material, and at least partially reduce the reducible material. The heating in the conversion zone 13 may initiate the reduction reaction in forming the reducible material into metallic iron nodules and slag. The conversion zone 13 is generally characterized by heating the reducible material to about 1800 to 2350° F. (about 980° C. to about 1290° C.), or higher, depending on the particular composition and form of reducible material of the particular embodiment.

The fusion zone 14 involves further heating the reducible material, now absent most volatile materials, to reduce and melt the iron bearing material, to form metallic iron nodules and slag. The fusion zone generally involves heating the reducible material to about 2400 to 2650° F. (about 1310-1450° C.), or higher, so that metallic iron nodules (NRI) are formed with a low percentage of iron oxide in the metallic iron. If the method is carried out efficiently, there will also be a low percentage of iron oxide in the slag, since the method is designed to reduce very high percentage of the iron oxide in the reducible material to metallic iron nodules.

Oxy-fuel burners 16 may be positioned in the side walls 18 of the furnace housing 11 for heating the reducible material in the conversion zone 13 and fusion zone 14. Alternatively or in addition, the oxy-fuel burners may be positioned in the roof 17 of the furnace housing 11. The oxy-fuel burners 16 are positioned to provide for efficient combustion of the fluidized volatile materials in the conversion zone and to efficiently reduce the reducible material to metallic iron nodules (NRI) in the fusion zone 14. The oxy-fuel burners 16 should be positioned to provide for efficient heat transfer and efficient reduction of the iron oxide in the reducible material with the least energy consumption. The oxy-fuel burners 16 may be positioned on about 10 foot centers (about 3 m), along the side walls 18, about a foot down from the roof 17 of the furnace housing 11. In addition, oxygen lances 29 may be positioned in the roof 17 of the furnace housing 11 of the conversion zone 13 and the fusion zone 14 to provide additional energy for generation of heat and reduction into metallic iron nodules in the furnace. Oxygen gas may be delivered to the oxy-fuel burners 16 and/or the oxygen lances 29 as desired.

Figure 3:
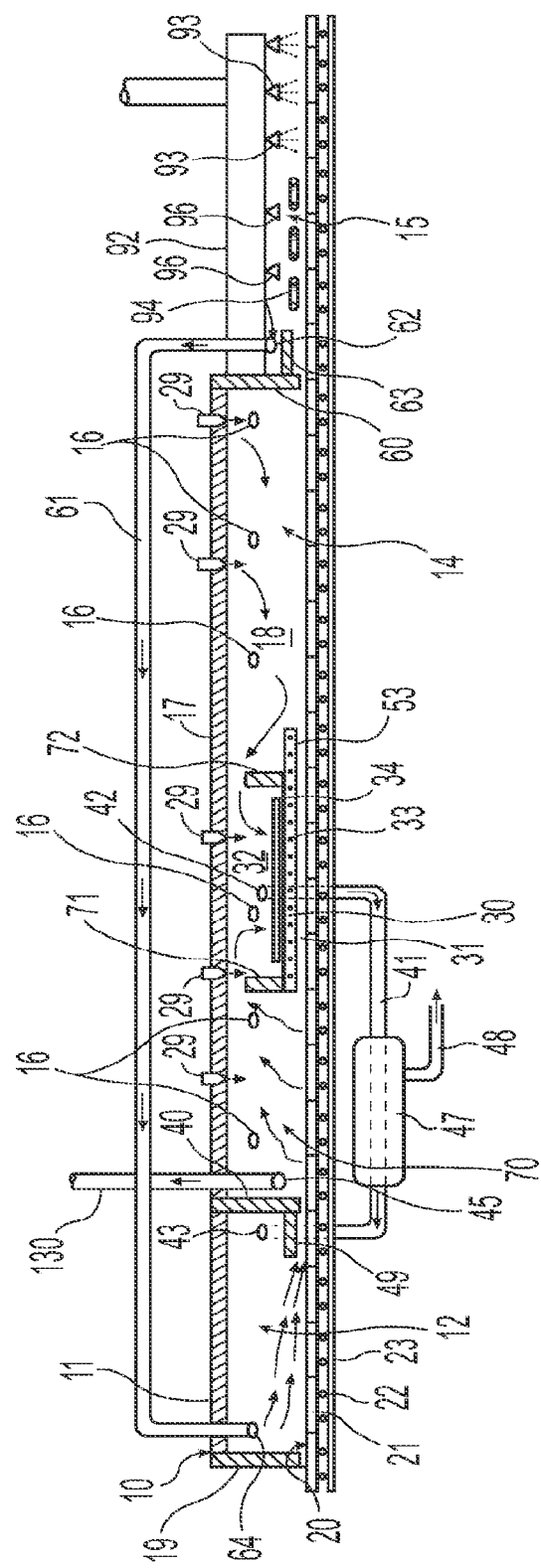
FIG. 3 is an elevation view illustrating an alternative embodiment of a hearth furnace for producing metallic iron material, and method of operation of the same.

The cooling zone 15 provides cooling to reduce the temperature of the metallic iron material (NRI) from its formation temperature in the conversion zone 13 and fusion zone 14 to a temperature at which the metallic iron material can be reasonably handled and further processed. This temperature after cooling is generally below 800° F. (about 425° C.) and may be below about 500° F. (about 260° C.). The cooling can be achieved by injection of nitrogen or carbon dioxide as discussed below through nozzles 96 in the roofs and/or side walls of the furnace housing or external to the furnace housing. As to the latter, water spray may be used external the furnace housing 11 for the cooling in the cooling zone 15, if desired, and provision made for water handling within the system. Alternatively or additionally, a system of coolant tubes 94 may be positioned over the moving hearth 20 as shown in FIG. 2. A vent hood 92 may be positioned above the moving hearth 20 to remove evaporated water and other fluidized materials that come off of the hearth during the spray cooling. Optionally, a horizontal baffle 63 may also be positioned above the moving hearth 20 in the cooling zone 15 to inhibit fluid flow between the fusion zone 14 and the cooling zone as shown in FIG. 3.

The cooling zone 15 is optionally in the furnace housing 11. However, it is more desirable in certain embodiments to perform the cooling of the metallic iron material outside the furnace housing 11, such as shown in FIGS. 1 through 4, to reduce furnace costs, provide for more efficient cooling, and maintenance and handling considerations.

A first baffle 40 may be provided between the drying/preheating zone 12 and the conversion zone 13. The first baffle 40 is capable of inhibiting direct fluid communication between the atmosphere of the conversion zone 13 and the atmosphere of the drying/preheating zone 12. The first baffle 40 may be made of a suitable refractory material, such as silicon carbide, and may extend downwardly to within a few inches of the reducible material on the hearth 42. The design is to provide for efficient inhibiting of the direct fluids communication between the conversion zone 13 and the drying/preheating zone 12 in the furnace 34, without interfering with movement of reducible material on hearth 42 through furnace housing 11.

In the furnace shown in FIG. 2, no bather or baffle is provided between the conversion zone 13 and the fusion zone 14. Optionally, a second baffle (not shown) may be provided either between conversion zone 13 and fusion zone 14 or part way into fusion zone 14. The optional second baffle is capable of inhibiting direct fluid communication between the atmosphere of the fusion zone 14 and the atmosphere of the conversion zone 13 where desired. The second baffle may be a refractory material, such as silicon carbide, and extend to within a few inches of the reducible material positioned on the hearth 20 as it moves through the furnace housing 11, to effectively inhibit the direct fluid communication across the second baffle.

The exit end of the hearth furnace 10, at the cooling zone 15, may be at least partially closed by a restricting baffle 60 that inhibits fluid flow between the atmosphere of the fusion zone 14 and the atmosphere of the cooling zone 15, yet provides clearance so as not to inhibit the movement of the heated reducible material out the furnace housing 11. The baffle 60 may be made of a suitable refractory material, such as silicon carbide, and may extend to within a few inches of the heated reducible material positioned on the hearth 20 as the heated reducible material moves through the furnace housing 11.

Combustion and other furnace gases are exhausted through an exhaust stack 130. FIG. 2 shows an exemplary placement of exhaust stack 130. Depending on desired operating conditions and desired gas flow in the furnace, exhaust stack 130 may be placed elsewhere in conversion zone 13, may be placed in fusion zone 14, or may be placed in drying/preheating zone 12. Further, there may be a single exhaust stack 130, or there may be multiple exhaust stacks or conduits placed in different locations within furnace 10 as desired in the particular embodiment. The drying/preheating zone may include a drying zone exhaust stack 24 provided to remove moisture and other fluids from the drying/preheating zone 12. The drying zone exhaust stack 24 may direct the flow from the drying/preheating atmosphere to combine with the stack gas through exhaust stack 130 for processing as discussed below. Alternately, the flow from the drying/preheating zone 12 may be directed to a scrubber, baghouse filter, or other exhaust processing separately or combined with other stack exhausts.

Referring to blocks 114 and 116 of FIG. 1, the preparation of the reducible material of iron bearing material and carbonaceous material for processing by the hearth furnace is illustrated. A hearth material layer is provided on hearth 20 that includes at least one carbonaceous material. The carbonaceous material may be any carbon-containing material suitable for use as a reductant with the iron-bearing material. The hearth material layer includes coke, char, or other carbonaceous material, or mixtures thereof. For example, anthracite coal, bituminous coal, sub-bituminous coal, coke, coke breeze, or char materials may be used for the hearth material layer. We have found that certain bituminous and sub-bituminous (e.g. Jim Walter and Powder River Basin) coals may be used in mixtures with anthracite coal, coke, coke breeze, graphite, or char materials.

The hearth material layer may comprise a mixture of finely divided coal and a material selected from the group of coke, char, and other carbonaceous material found to be beneficial to increase the efficiency of iron reduction. The coal particles may be a mixture of different coals such as non-coking coal, non-caking coal, sub-bituminous coal, or lignite. The hearth material layer may, for example, include Powder River Basin ("PRB") coal and/or char. Additionally, although up to one hundred percent coal is contemplated for use as a hearth material layer, in some embodiments the finely divided coal may comprise up to twenty-five percent (25%) and may be mixed with coke, char, anthracite coal, or other low-volatile carbonaceous material, or mixtures thereof. In other embodiments, up to fifty percent (50%) of the hearth material layer may comprise coal, or up to seventy-five percent (75%) of the hearth material layer may comprise coal, with the remaining portion coke, char, other low-volatile carbonaceous materials, or mixtures thereof. The balance will usually be determined by the amount of volatiles desired in the reduction process and the furnace.

Using coal in the hearth material layer provides volatiles to the furnace to be combusted providing heat for the process. The volatiles can be directly burned near the location of their volatilization from the coal, or may be communicated to a different location in the furnace to be burned at a more desirable location. Regardless of the location in the hearth furnace, the volatiles can be consumed to at least partially heat the reducible material efficiently. The carbonaceous material in the hearth layer also may provide a reductant source for reducing the iron bearing material in the furnace while still protecting the hearth refractories.

The hearth material layer is of a thickness sufficient to prevent slag from penetrating the hearth material layer and contacting the refractory material of the hearth 20. For example, the carbonaceous material may be ground or pulverized to an extent such that it is fine enough to prevent the slag from such penetration, but typically not so fine as to create excess ash. As recognized by one skilled in the art, contact of slag with the hearth 20 during the metallic iron nodules process may produce undesirable damage to the refractory material of hearth 20. A suitable particle size for the carbonaceous material of the hearth layer is less than 4 mesh and desirably between 4 and 100 mesh, with a reasonable hearth layer thickness of about ½ inch or more effective protection for the hearth 20 from penetration of the slag and metallic iron during processing. Carbonaceous material less than 100 mesh may be avoided because it is generally high in ash, and resulting in entrained dust that is difficult to handle in commercial operations. The mesh size of the discrete particles is measured by Tyler Mesh Size for the measurements given herein.

As shown in block 116 of FIG. 1, the reducible material is positioned over the hearth cars 21 above at least a portion of the hearth material layer, typically prior to entering the furnace. The reducible material is generally in the form of a mixture of finely divided iron ore, or other iron oxide bearing material, and a reducing carbonaceous material, such as coke, char, anthracite coal or non-caking bituminous and sub-bituminous coal. The reducible material is in mixtures of finely divided iron bearing material that are formed into compacts. The compacts may be briquettes, balls, or mounds preformed or formed in situ on the hearth cars 21 so that the mixtures of reducible material are presented to the furnace 10 in discrete portions.

The iron-bearing material may include any material capable of being formed into metallic iron nodules via method 110 for producing metallic iron nodules as described with reference to FIG. 1. The reducible iron bearing material may contain at least a material selected from the group consisting of mill scale, magnetite, hematite, and combinations thereof. For example, the iron-bearing material may include iron oxide material, iron ore concentrate, taconite pellets, recyclable iron-bearing material, pellet plant wastes and pellet screened fines. Further, such pellet plant wastes and pellet screened fines may include a substantial quantity of hematite. In addition, such iron-bearing material may include magnetite concentrates, oxidized iron ores, steel plant wastes, red mud from bauxite processing, titanium-bearing iron sands and ilmenites, manganiferous iron ores, alumina plant wastes, or nickel-bearing oxidic iron ores. Also, less expensive iron ores high in silica may be used. Other reducible iron bearing materials may also be used for making the reducible material for producing metallic iron nodules used in the processes described herein to produce metallic iron nodules. For example, nickel-bearing laterites and garnierite ores for ferronickel nodules, or titanium bearing iron oxides such as ilmenite that can be made into metallic titanium iron nodules (while producing a titania rich slag).

The iron-bearing material may include recycled micro metallic iron nodules formed in the process of producing metallic iron nodules. Micro metallic iron nodules (called micro-nodules or micro-nuggets) include small particles of agglomerated iron having a size between about 20 mesh and about 3 mesh. Metallic iron nodules less than 20 mesh can also be used depending on the availability of separation and handling systems to recycle micro nodules.

In one alternative, the reducible material may contain mill scale containing more than 55% by weight FeO and FeO equivalent, such as disclosed in U.S. Provisional Patent Application 61/146,455 filed Jan. 22, 2009, incorporated herein by reference.

The iron-bearing material may be finely-ground or otherwise physically reduced in particle size. The particle size of the mill scale or mixture of mill scale and similar metallurgical waste may be at least 80% less than 10 mesh. Alternatively, the iron-bearing metallurgical waste may be of a particle size of at least 80% less than 14 mesh. In one alternative, the iron-bearing material may be ground to less than 65 mesh (i.e., −65 mesh) or less than 100 mesh (i.e., −100 mesh) in size for processing according to the disclosed method of making metallic iron nodules. Larger size particles, however, of iron-bearing material may also be used. For example, pellet screened fines and pellet plant wastes are generally approximately 3 mesh (about 0.25 inches) in average size. Such material may be used directly, or may be reduced in particle size to increase surface contact of carbonaceous reductant with the iron bearing material during processing. A smaller particle size tends to reduce fusion time in the present method.

Various carbonaceous materials may be used in providing the reducible material of reducing material and reducible iron-bearing material. The reducing material may contain at least a material selected from the group consisting of, anthracite coal, coke, char, bituminous, sub-bituminous such as Jim Walter coal, Powdered River Basin coal, or combinations thereof. For example, eastern anthracite coal and bituminous non-caking coals may be used as the carbonaceous reductant in at least one embodiment. However, sub-bituminous non-caking coal may also be used, such as PRB coal. Sub-bituminous coal may be useful in some geographical regions, such as on the Iron Range in northern Minnesota, as such coals are more readily accessible with the rail transportation systems already in place and in some cases are lower in cost and lower in sulfur levels. As such, western sub-bituminous coals may be used in one or more embodiments of the present method as described herein. Alternatively, or in addition, the sub-bituminous coals may be carbonized, such as up to about 1650° F. (about 900° C.), prior to its use. Other coals may be provided, such as low sulfur bituminous coal from Elkhorn seams from eastern Kentucky, as described below. In any case, the carbonaceous material in the reducible material may contain an amount of sulfur in a range from about 0.2% to about 1.5%, and more typically, in the range of 0.5% to 0.8%.

The amount of reducing material in the mixture with iron bearing material to form the reducible material will depend on the stoichiometric quantity necessary for complete metallic reduction of the iron in the reducing reaction in the furnace. Such a quantity may vary depending upon the percentage of iron in the iron-bearing material, the reducing material and the furnace used, as well as the furnace atmosphere in which the reducing reaction takes place. In some embodiments, where the iron bearing material is hematite or magnetite or mixtures thereof, the carbonaceous material in the reducible material may be between 70 and 90% of the stoichiometric amount to complete reduction of the iron in the iron-bearing material. Where the iron bearing material in the reducible material is mill scale or the like with high levels of FeO, the reducible material may include an amount of carbonaceous material that is between 80 and 110% of the stoichiometric amount needed to reduce the iron-bearing material to metallic iron. In other alternative embodiments where mill scale or the like is used for the iron bearing material, the quantity of reducing material necessary to carry out the reduction of the iron-bearing material is between about 85 percent and 105 percent of the stoichiometric quantity of reducing material needed for carrying out the reduction to metallize the iron, and may be between 90 percent and 100 percent.

In an alternative embodiment of the present method, a layer containing coarse carbonaceous material may also be provided over at least some of the discrete portions of the reducible material. The coarse carbonaceous material of the overlayer may have an average particle size greater than an average particle size of the hearth layer carbonaceous material. In addition or alternatively, the overlayer of coarse carbonaceous material may include discrete particles having a size greater than about 4 mesh or about 6 mesh, and in some embodiments, the overlayer of coarse carbonaceous material may have discrete particles with a size between about 4 mesh or 6 mesh and about ½ inch (about 12.7 mm). There may be of course some particles in the coarse carbonaceous material less than 4 mesh or 6 mesh in size in commercially made products, but the substantial majority of the discrete particles will be greater than 4 mesh or 6 mesh where a coarse carbonaceous material of particle size greater than 4 mesh or 6 mesh is desired. Finer particles of carbonaceous material that may be present in some commercially available compositions may be used but less desired. The coarse carbonaceous material may be selected from the group consisting of anthracite coal, bituminous coal, sub-bituminous coal such as PRB coal, coke, char, and mixtures of two or more thereof.

The conversion zone and fusion zone may be heated to a temperature sufficient to reduce the reducible material by delivering oxygen gas through the oxygen lances 29 and/or the oxy-fuel burners 16 in a ratio of at least 0.7:1 pounds of oxygen to pounds of iron in the reducible material directly into the conversion zone to aid in the combustion of volatiles evolving from the carbonaceous materials as well as the carbonaceous material in the hearth furnace providing additional heat to the furnace. The conversion zone 13 can be heated to a temperature of about 2350° F. (about 1290° C.) without delivery of any additional hydrocarbon fuels through the oxy-burners. Similarly, the fusion zone 14 can be heated to a temperature sufficient to reduce the reducible material to form metallic iron nodules and slag by delivery of the oxygen gas without delivery of any additional hydrocarbon fuels through the oxy-burners. The fusion zone 14 may be heated to a temperature of about 2550° F. (about 1400° C.). Alternatively, delivery of hydrocarbon fuels through one or more oxy-burners may be provided in the conversion zone 13 or fusion zone 14 to supplement the heating from delivery of oxygen gas as desired. In any case, the oxygen gas may be pure oxygen, which for purposes of this disclosure, includes commercially available oxygen gas having a concentration of at least 95% oxygen.

As shown in FIG. 2, the oxygen gas may be delivered into the furnace through oxygen lances 29 positioned in the roof 17 of the furnace housing 11 in both the conversion zone 13 and the fusion zone 14. The oxygen lances may extend within about 18 inches (45.7 cm) downward from the roof 17 into the interior of the furnace. Alternatively or additionally, the oxygen lances 29 or oxy-fuel burners 16 may be positioned in the side walls 18 so as to deliver oxygen gas more closely to the reducible material positioned on the hearth cars 21. In either embodiment, the flow of oxygen gas avoids impinging upon the reducible material or alternatively the coarse carbonaceous overlayer as described. The oxygen gas may be also delivered to the drying/preheating zone 12 in order to regulate temperature.

Referring to box 118 of FIG. 1, as explained the oxygen gas is delivered into the conversion zone and fusion zone at a ratio of at least 0.7:1 pounds of oxygen per pound of iron in the reducible iron bearing material in the conversion zone and fusion zone of the furnace. In other alternate embodiments, the ratio of pounds of oxygen gas per pound of iron in the reducible iron bearing material in the furnace may be at least 0.8:1, 0.9:1, at least 1:1, at least 1.2:1, at least 1.5:1, or at least 1.7:1, depending upon the composition of the carbonaceous materials in the hearth layer, in the reducible material, and, if provided, in the coarse carbonaceous overlayer. It should be noted that although the ratio of pounds of oxygen gas per pound of iron in the reducible iron bearing material in the conversion zone and fusion zone of the furnace may be controlled as desired, the particular ratio within a particular volume of the furnace may be higher or lower depending upon the concentration of other gases within that particular volume.

The flow of oxygen gas may be regulated along the length of the conversion and fusion zones of the furnace 10 according to the concentration of carbon monoxide and volatiles fluidized from the reducible materials to more efficiently oxidize the carbon monoxide and combust the volatiles. The fluidization of volatiles is dependent upon the composition of the carbonaceous materials charged into the furnace and the temperature profile of the furnace. A higher flow of oxygen gas may be directed to where higher levels of carbon monoxide are found along the length of the conversion and fusion zones, such as toward the beginning of the conversion zone. Less oxygen gas may then be directed to where lower levels of carbon dioxide are present within the furnace, such as the downstream end of the fusion zone.

By increasing the amount of carbon monoxide and hydrogen gas oxidized in the furnace 10, the resultant stack gas from the exhaust stack 130 of the furnace has a reduced concentration of carbon monoxide and hydrogen and increased concentrations of carbon dioxide and water vapor, as compared to the stack gas generated when oxygen gas is delivered to the conversion and fusion zone of the furnace 10 in more even concentration along the furnace. Decreasing the carbon monoxide and hydrogen content in the stack gas results in reducing if not eliminating the need for a thermal-oxidizer in the flue gas stream to oxidize the stack gas, as described below with reference to FIG. 4.

In some embodiments, the flow of oxygen gas to certain points along the furnace may cause the ratio of oxygen gas to iron in reducible iron bearing material to be higher than said ratio along the conversion and fusion zones overall. For example, the ratio of oxygen gas to iron in the reducible material delivered at the upstream end of the conversion zone 13 may be higher than said overall ratio of oxygen gas to iron in the reducible material delivered to the conversion and fusion zones. In this configuration, volatile gases evolved in the conversion zone 13 are also combusted with the oxygen gas. As shown in FIG. 2, the flow of combustion products from the fluidized volatile material also moves to the exhaust stack 130.

Additionally or alternatively, the flow of oxygen gas may be higher than the overall ratio of oxygen gas to iron in the reducible material in certain other parts of the conversion and fusion zones, such as near the downstream end of the conversion zone 13 and the upstream end of the fusion zone 14, where higher concentrations of hydrogen gas and carbon monoxide are likely found. Again, by this regulation of oxygen gas, the hydrogen gas and carbon monoxide are more likely oxidized in the furnace, thereby increasing the concentration of water vapor and carbon dioxide in the stack gas while decreasing the concentration of hydrogen and carbon monoxide in the stack gas.

In some embodiments, as shown in FIG. 2, an increased flow of oxygen gas resulting in a ratio of oxygen gas to iron in the reducible material higher than the desired overall ratio along the conversion and fusion zones may be delivered into the conversion zone 13 at a position past, but nearly adjacent, the location of the exhaust stack 130. In these embodiments, gases flow from the fusion zone 14 through the conversion zone 13 toward and into the exhaust stack 130, in a direction counter to the movement of the movement of hearth cars 21 through the furnace housing 11. As the hydrogen gas and other volatiles formed in the conversion zone 13 and fusion zone 14 flow toward the exhaust stack 130, they are oxidized by the increased flow of oxygen prior to flowing into the exhaust stack. Alternatively or in addition, a stack may be positioned at the downstream end of the fusion zone 14, in which embodiments the gas flow through the furnace may be in the same direction as the movement of hearth cars 21 through the furnace housing 11, in which case the ratio of oxygen gas to iron in the reducible material may be varied, to be greater and lesser than said ratio delivered overall to the furnace, to correspond to the location of high carbon monoxide and hydrogen levels generated in the furnace. It will be apparent that the exhaust stack or stacks may be positioned at any desired locations through the furnace, and the flow of oxygen gas varied accordingly above and below the ratio of the overall oxygen gas to the conversion and fusion zones to iron in the reducible material to provide for most efficient oxidization of the carbon monoxide and hydrogen in the furnace atmosphere.

In some furnace configurations, such as those described in PCT/US10/50730, filed Sep. 29, 2010, we have found that the system performance improves when the axial velocity, or the velocity of the flow of gas in the longitudinal direction along the furnace, of the primary flow of gases through the conversion and fusion zones is greater than about 4 feet per second near the hearth. In one alternative, the axial velocity is between about 5 feet per second and 10 feet per second near the hearth. In yet another alternative, the axial velocity is between about 4 feet per second and 15 feet per second near the hearth. Higher axial velocities may be may be achieved with consideration of the materials on the hearth to reduce entrainment of solids from the hearth into the flow of gases.

The oxy-fuel burners 16 may also be fired with a fuel, including without limitation natural gas, methane, propane, fuel oil, and coal, at the start of a campaign to heat each zone of the furnace to sufficient temperature, for example, about 2350° F. (about 1290° C.) in the conversion zone and about 2550° F. (1400° C.) in the fusion zone. Subsequently, the oxygen gas may be continuously delivered into the conversion and fusion zones through the oxygen lances 29 and/or through the oxy-fuel burners 16 at a rate sufficient to maintain the zones at the temperatures to reduce reducible material in the furnace and produce metallic iron nodules without other fuel. Note the oxygen gas may also be delivered during start up to assist in heating the zones of the furnace to desired temperatures to reduce the reducible material in the furnace and produce metallic iron nodules. Once the rate of oxygen gas delivery is sufficient to maintain the desired temperature through combustion of the evolved volatiles and carbonaceous material from the furnace charge, the delivery of the combustible fuels through the oxy-fuel burners may be substantially reduced and may be shut off to avoid fuel usage and to more efficiently operate the furnace to produce metallic iron nodules in accordance with the present method. Although this amount of oxygen gas will vary with the particular embodiment, the amount of oxygen gas delivered to the conversion zone and fusion zone is likely in the overall ratio of at least 0.7:1 pounds of oxygen to pounds of iron in the reducible material. In some embodiments, this overall ratio of pounds of oxygen gas per pound of iron in the reducible iron bearing material in the furnace may be at least 0.8:1, at least 0.9:1, at least 1:1, at least 1.2:1, at least 1.5:1, or at least 1.7:1, depending upon the composition of the iron bearing material and the composition of the carbonaceous materials in hearth layer, in the reducible material, and, if provided, in the coarse carbonaceous overlayer.

In an alternative embodiment shown in FIG. 3, a separation barrier 30 is positioned in the conversion zone 13 and/or fusion zone 14, separating the conversion zone and/or fusion zone under the separation barrier 30 into a reducing region 31 adjacent the hearth 20 and a combustion region 32 adjacent the reducing region 31 and spaced from the hearth 20. In some embodiments the separation barrier 30 may comprise closed spaced pipes 33, e.g., 2 foot on centers (about 0.6 m), positioned transverse between side walls 18, and supporting a plate or grate 34 as shown in FIG. 3. The plate or grate 34 may be made of silicon carbide or another suitable refractory or ceramic material. The separation barrier 30 may be positioned from the baffle 40 to provide an area 70 between the baffle 40 and the separation barrier 30 positioned in the conversion zone 13 and/or fusion zone 14, where volatilizable materials associated with the reducible materials are more likely to fluidize and be available for combustion. The separation barrier 30 may be of a heat conductive material capable of conducting the heat generated in the combustion region 32 to the reducing region 31 to reduce the reducible material positioned on the hearth 20, or heat radiating material capable of absorbing heat form the combustion of the fluidized volatile material in the combustion region 32 and radiating heat into the reducing region 31 to reduce the reducible material, or both. The separation barrier may be made of silicon carbide or other such higher heat conductive refractory material.

As shown in FIG. 3, a first weir 71 may be positioned contiguous with the separation barrier 30 in conversion zone 13 and/or fusion zone 14 to reduce direct fluid communication between the atmosphere of the conversion zone 13 not covered by the separation barrier 30 in the space 70 and the atmosphere of the combustion region 32 adjacent at least the portion of the separation barrier 30, while allowing fluidized volatile materials to flow over the first weir 71 into the combustion region 32. The volatilizable material on the hearth 20 may be fluidized in area 70 before the hearth moves under the separation barrier 30. A second weir 72 may be positioned contiguous with the separation bather 30 to reduce direct fluid communication from the atmosphere of the fusion zone 14 not covered by the separation barrier 30 to the atmosphere of the combustion region 32 above the separation bather 30, while allowing fluid to flow over the second weir 72 from the fusion zone 14 into the combustion region 32. To facilitate the flow of fluid countercurrent in the fusion zone 14, the second weir 72 may be offset from the end of the separation barrier 30 as shown by 53 in FIG. 3.

The oxygen gas may be delivered to the combustion region 32 to combust the fluidized volatile material for more efficient operation of the furnace and reduction of the iron-oxide bearing material to produce metallic iron nodules. The combusted fluids with the heat from combustion can then be transported to other parts of the furnace for efficient reduction of the reducible material to metallic iron nodules and slag. To provide for this flow from the reducing region 31 to the combustion region 32, a flow may be created through the atmosphere of the reducing region 31 in the direction of travel of the moving hearth 20, and in a part of the combustion region 32 in a direction counter to or in the direction of movement of the hearth through the furnace housing 11.

The fluids combusted in the combustion region 32 flow toward the fusion zone providing for heating and efficient production of the metallic iron nodules in the furnace and exit with furnace gases through the exhaust stack 130. Alternatively or in addition, a first communication passageway 41 may also be provided capable of carrying at least some of the fluids from the combustion region 32 to the drying/preheating zone 12. The first communication passageway 41 may be a chamber or chambers laterally positioned in the side(s) of the furnace housing 11 with a double refractory wall, or ducting which extends through the side(s) of the furnace housing 11 as shown in FIG. 3. An inlet 42 to the first communication passageway 41 may be positioned in the side walls 18 of the furnace housing 11, and may be a plenum to carry fluid from the atmosphere of combustion region 32 between first and second weirs 71 and 72 to other parts of the furnace.

The inlet 42 to first communication passageway 41 is located to provide for efficient combustion of the fluidized volatile material in combustion region 32, and to efficiently move the combusted fluids from the combustion region 32 to the fusion zone 14 or to the drying/preheating zone 12 as desired. The flow through first communication passageway 41 may also provide the pressure drop to facilitate flow of volatile fluids from the reducing region 31 to the combustion region 32, to provide flow of the fluidized volatile material within the reducing region 31 in the direction of travel of hearth 20 through the furnace housing 11, and to provide for flow of the fluidized volatile material and combusted fluids from the combustion region 32 to other parts of the furnace for efficient use of the combustion heat in other parts of the furnace. The outlet 43 of first communication passageway 41 may be provided adjacent the first baffle 40, and near the reducible material, to provide for efficient use of the fluid flow from passageway 41 in drying and preheating the reducible material in drying/preheating zone 12. To provide flow of the fluid through drying/preheating zone 12 counter to the movement of the hearth 20 through the furnace housing 11, a generally horizontal baffle 49 may extend from first baffle 40 into the drying/preheating zone 12 to direct flow of the fluid from outlet 43 of first communication passageway 41 through the drying/preheating zone 12, to efficiently transfer heat from the transported fluid to dry and preheat the reducible material on the hearth 20.

The temperature of the combusted fluids through first communication passageway 41 is generally too high for effective use of the drying/preheating zone 12. The hot gases may be directed to a temperature controller 47 positioned in first communication passageway 41 and capable of controlling the temperature of the fluid flowing from the combustion region 32 of the conversion zone 13 to the drying/preheating zone 12. The temperature controller 47 may cool the fluid transported through first communication passageway 41 by mixing with a cooling gas such as tempering air or nitrogen transported from cooling zone 15. Alternatively, the temperature controller 47 may be in the form of a heat exchanger capable of controlling the temperature of the fluid flowing through first communication passageway 41 by extracting and recovering heat from the fluid flow in the first communication passageway 41. The extracted and recovered heat may be transferred to a secondary fluid in the heat exchanger 47, the secondary fluid transferred by a duct 48 to be used as desired.

A third communication passageway 61 may be provided to enable movement of fluid through the atmosphere of cooling zone 15 to extract heat from the metallic iron nodules in the cooling zone 15 for use in the drying/preheating zone 12. The third communication passageway 61 may have an inlet 62 positioned adjacent the third baffle 60, and a horizontal baffle 63 may be provided extending from the third baffle 60 to direct the flow of fluid to the inlet 62. An outlet 64 from the third communication passageway 61 may be positioned adjacent the restricting baffle 19. Alternatively, if desired, all or part of the fluid flow through the third communication passageway 61 may be directed to the temperature controller 47, and may be mixed with a fluid flow through communication passageway 41 to control the temperature of the fluid flow to the drying/preheating zone 12.

The third communication passageway 61 may be provided in lateral chambers as part of the furnace housing 11 or by separate ducting through the roof 17 or side walls 18 of furnace housing 11. In either case, the communication passageways should be insulated to reduce the loss of heat and transfer heat from one part of the furnace 10 to another, and in turn increase the efficiency of the furnace 10.

Alternatively or in addition, delivering a flow of the oxygen gas into the conversion zone and fusion zone at a ratio of at least 0.7:1 pounds of oxygen per pound of iron in the reducible iron bearing material in the furnace as discussed above may be provided in other furnace configurations, such as those disclosed in U.S. patent application Ser. No. 12/418,037, filed Apr. 3, 2009, which is incorporated herein by reference.

Figure 4:
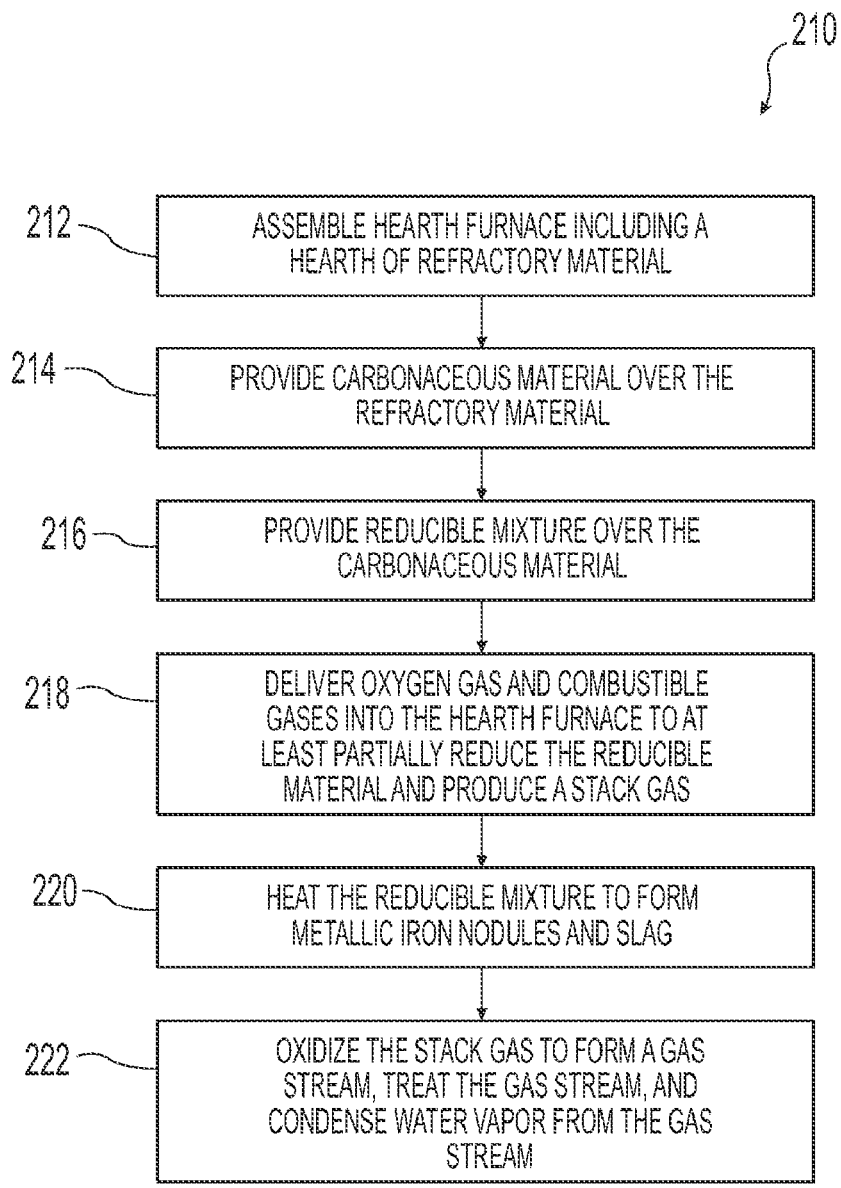
FIG. 4 is a block diagram of another general embodiment of a metallic iron nodule process.

FIG. 4 shows a block diagram of an illustrative embodiment of a method 210 to produce metallic iron nodules, which may be implemented using one of the embodiments of the hearth furnaces previously described with reference to FIGS. 2 and 3.

Stack emissions produced with the present method are sufficiently high in carbon dioxide that a thermal oxidizer may not be necessary in the stack gas stream. By reducing the moisture and further cleaning the stack gas stream exhausted through the stack 130 a gas stream can be produced having at least 90% or 95% carbon dioxide. Referring to box 218 of FIG. 10, oxygen gas and optionally, combustible fuels, are delivered to the conversion zone 13 and the fusion zone 14 such that the conversion zone is heated to a temperature sufficient to at least partially reduce the reducible material, and the fusion zone is heated to a temperature sufficient to at least partially reduce the reducible material to metallic iron nodules. The stack gas produced may have a composition of at least 25% carbon dioxide. In addition to carbon dioxide, the stack gas may include carbon monoxide, hydrogen, water vapor, oxygen, and methane. For example, the stack gas may contain about 40% $CO_2$, about 42% $H_2O$, about 10% CO, about 5% $H_2$, and about 3% other fluids. In an oxygen-fueled system, the stack gas stream is typically low in nitrogen gas. The stack gas may also include, in fluid form, sulfur-containing and halogen-containing compounds.

Figure 5:
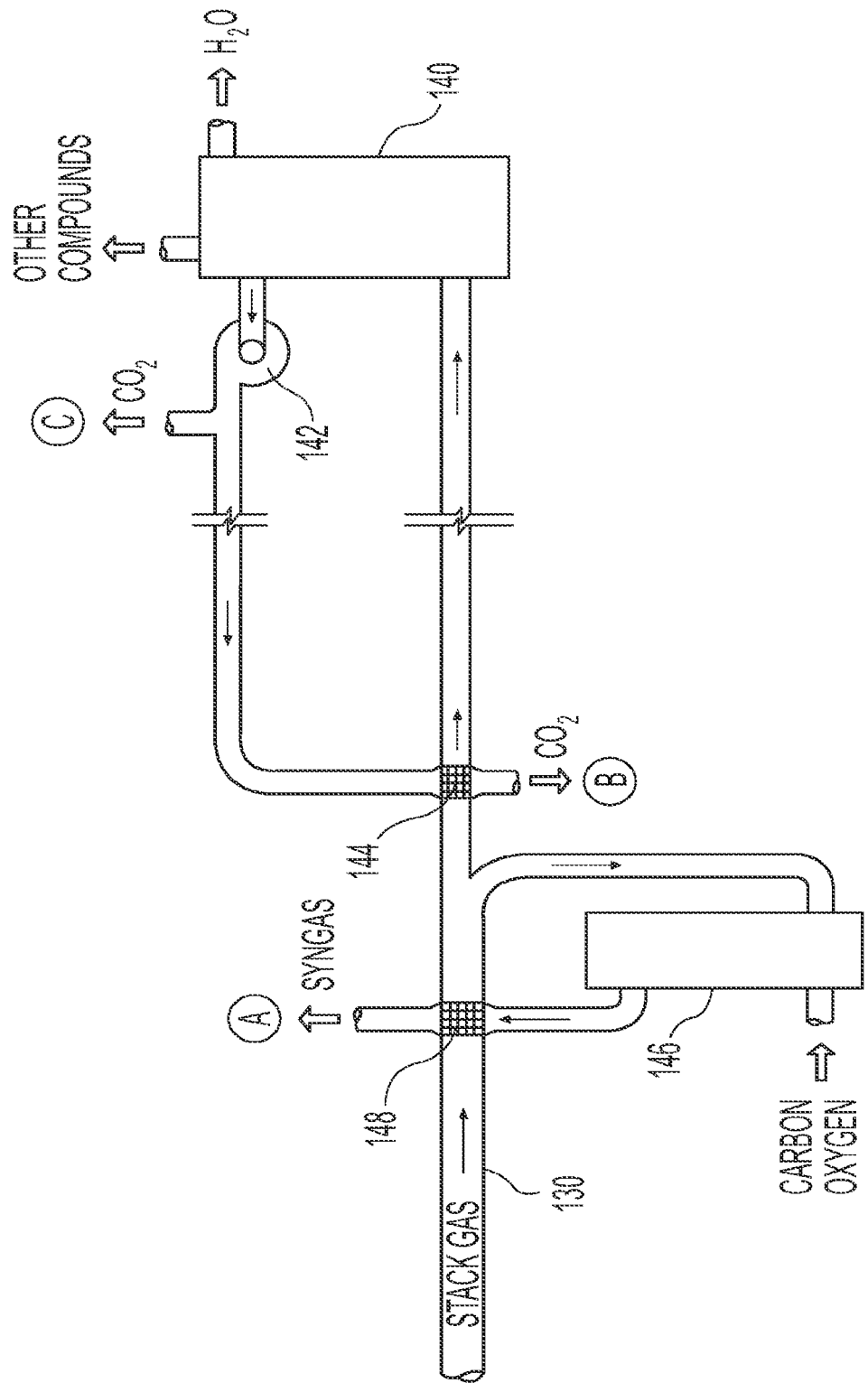
FIG. 5 is a schematic flow diagram of a $CO_2$ and heat recovery system for use with the present hearth furnace system.

With reference to box 222 of FIG. 4 and FIG. 5, at least a portion of the stack gas may be directed to the scrubber 140 for processing. The stack gas may be processed to produce a gas stream having a composition of at least 90% or 95% carbon dioxide by oxidizing carbon monoxide and hydrogen, treating the gas stream to remove at least one of sulfur-containing and halogen-containing compounds, and condensing water vapor from the gas stream.

The water vapor may be removed from the gas stream by cooling to a temperature at which any water vapor present in the gas stream would condense, for example at a temperature below about 212° F. (about 100° C.) at atmospheric pressure. The remaining gas stream contains a high concentration of $CO_2$, and may exit the scrubber 140 between about 100° F. and 500° F. (between about 40° C. and 260° C.). Alternatively, the gas stream may be cooled to a temperature of about 80° F. (27° C.). A blower 142 may be provided to convey the $CO_2$ stream cooled to a temperature suitable for the blower 142 as desired. The cooled carbon dioxide stream is shown as C in FIG. 5. At least a portion of the cooled $CO_2$ stream may be delivered into the cooling zone 15 through nozzles 96 to provide cooling of the metallic iron and carbonaceous material.

As sulfur-containing and halogen-containing compounds are not desirable in the carbon dioxide gas stream, these compounds may also be removed from the gas stream in the scrubber. The gas stream may be treated using lime and/or limestone, which may react with sulfur dioxide present in the gas stream to form calcium sulfate dihydrate ($CaSO_4.2H_2O$), also known as gypsum.

It is to be understood that the gas stream may be cooled to condense the water vapor before or after the gas stream is treated with lime and/or limestone in order to remove sulfur-containing and/or halogen-containing compounds.

Once the gas stream has been treated and water has been condensed therefrom, a gas stream containing at least 90% or 95% carbon dioxide remains. This gas stream having a high carbon dioxide concentration is a salable product or may be subsequently processed. The cooled carbon dioxide stream, shown as C in FIG. 5, may be condensed into a liquid, precipitated into a carbonate, or transported through a pipeline for use, sale, or disposal at a location apart from the metallic iron nodule production location. For example, the captured carbon dioxide may be injected into a mature oil well to enhance oil recovery. In another alternative, the carbon dioxide may be injected into geological formations such as gas fields, saline formations, unminable coal seams, and saline-filled basalt formations. In this method, known as sequestration, the carbon dioxide can be chemically reacted to produce stable carbonates, thereby reducing the amount of carbon dioxide emitted into the atmosphere from production of metallic iron nodules. In one embodiment, a majority of the $CO_2$ gas stream is directed to sequestration, while a minority is retained for use in the hearth furnace system.

The $CO_2$ stream may be utilized in the furnace 10 in producing iron nodules by the present methods. The $CO_2$ stream may be heated and directed into the furnace housing 11 as desired. Also, the $CO_2$ stream may be mixed with oxygen gas as it is directed into the furnace. To heat the $CO_2$ before such mixing with the oxygen, the $CO_2$ may be directed through a heat exchanger 144 to recover heat from the stack gas exiting the furnace 10. The heated $CO_2$ stream, shown as B in FIG. 5, may be directed to heat the drying/preheating zone, the conversion zone, and/or the fusion zone. Alternatively, the $CO_2$ stream may be mixed with the oxygen gas delivered to the furnace through oxy-burners and/or oxygen lances to regulate the flame temperatures in the furnace as discussed below. Using these techniques, the emission of $CO_2$ gas into the ambient atmosphere may be reduced. This subsequent capturing of the $CO_2$ emissions produces an additional second product by use of the present method.

Lower flame temperatures may be used to decrease the wear of burner components exposed to excessive heat, increasing burner life and reducing maintenance. Flame temperatures are controlled by the concentration of oxygen in the stream. Flame temperature increases with increasing oxygen concentration. The adiabatic flame temperature for pure oxygen and methane is approximately 5000° F. (2760° C.), while the adiabatic flame temperature for a 30% oxygen/70% carbon dioxide mixture approaches that of an air/natural gas flame at about 3800° F. (about 2090° C.). Since flame temperature is dependent on the oxygen concentration, the delivery of oxygen may be diluted with carbon dioxide to adjust the flame temperature as desired. Diluting the oxygen stream with carbon dioxide reduces the relative concentrations of fuel and oxidant thereby decreasing flame temperature. Additionally, dilution of oxygen with carbon dioxide enables recovery of a portion of the waste heat to the furnace, such as by direct transfer of gases, or using heat exchange with hot flue gases. As discussed above, the $CO_2$ may be directed through the heat exchanger 144 before such mixing with the oxygen to recover heat from the stack gas exiting the furnace 10. The $CO_2$ may be preheated to about 750° F. (about 400° C.) in the heat exchanger 144. Alternately, the $CO_2$ may be preheated to between about 400° F. (about 200° C.) and 1500° F. (about 810° C.) in the heat exchanger 144.

Alternately or in addition, at least a portion of the stack gas may be directed into a gasifier 146. The gasifier 146 may be utilized to process carbon-containing materials such as by-products from the iron reduction process, including ash, char and coal powders, slag, and other waste materials. The stack gas, with injected oxygen and carbon-containing materials, may be processed in the gasifier 146 to produce a mixture of CO and $H_2$, or syn-gas. The syn-gas stream, shown as A in FIG. 5, may be heated in a heat exchanger 148 and then directed into the furnace 10 as a reductant and as a fuel. The syn-gas may be preheated to about 1000° F. (about 540° C.) in the heat exchanger 148. Alternately, the syn-gas may be preheated to between about 400° F. (about 200° C.) and 1200° F. (about 650° C.) in the heat exchanger 148. By processing waste materials the gasifier 146 may further improve the overall efficiency of the method of producing metallic iron nodules.

While the invention has been illustrated and described in detail in the foregoing drawings and description, the same is to be considered as illustrative and not restrictive in character, it being understood that only illustrative embodiments thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A method for producing metallic iron nodules comprising the steps of:
    assembling a hearth furnace having a moveable hearth comprising refractory material and having at least a conversion zone and a fusion zone,
    providing a hearth material layer comprising carbonaceous material on the refractory material,
    providing a layer of reducible material comprising reducing material and iron bearing material arranged in a plurality of discrete portions over at least a portion of the hearth material layer,
    delivering oxygen gas into the hearth furnace in the conversion and fusion zones at a ratio of at least 0.7:1 pounds of oxygen to pounds of iron in the reducible material to heat the conversion zone to a temperature sufficient to at least partially reduce the reducible material and to heat the fusion zone to a temperature sufficient to at least partially reduce the reducible material, and
    heating the layer of reducible material to form from the discrete portions one or more metallic iron nodules and slag.

2. The method for producing metallic iron nodules of claim 1 where the delivering of oxygen gas is in a ratio of at least 0.8:1 pounds of oxygen to pounds of iron in the reducible material.

3. The method for producing metallic iron nodules of claim 1 where the delivering of oxygen gas is in a ratio of at least 0.9:1 pounds of oxygen to pounds of iron in the reducible material.

4. The method for producing metallic iron nodules of claim 1 where the delivering of oxygen gas is in a ratio of at least 1:1 pounds of oxygen to pounds of iron in the reducible material.

5. The method for producing metallic iron nodules of claim 1 where the delivering of oxygen gas is in a ratio of at least 1.2:1 pounds of oxygen to pounds of iron in the reducible material.

6. The method for producing metallic iron nodules of claim 1 where the delivering of oxygen gas is in a ratio of at least 1.5:1 pounds of oxygen to pounds of iron in the reducible material.

7. The method for producing metallic iron nodules of claim 1 where the delivering of oxygen gas is in a ratio of at least 1.7:1 pounds of oxygen to pounds of iron in the reducible material.

8. The method for producing metallic iron nodules of claim 1 where the step of delivering oxygen gas to the conversion zone and the fusion zone is through one or more oxygen lances, oxy-burners, or both.

9. The method for producing metallic iron nodules of claim 8 where the one or more oxygen lances deliver the oxygen gas from a position less than 18 inches from a top of the interior of the hearth furnace.

10. The method for producing metallic iron nodules of claim 1 where the conversion zone is heated to at least 2350° F. (about 1290° C.).

11. The method for producing metallic iron nodules of claim 1 where the fusion zone is heated to at least 2550° F. (about 1400° C.).

12. The method for producing metallic iron nodules of claim 1 further comprising: assembling a drying zone adjacent the conversion in the hearth furnace.

13. The method for producing metallic iron nodules of claim 12 where the drying zone is heated to between about 300-600° F. (about 150-315° C.).

14. The method for producing metallic iron nodules of claim 1 further comprising: assembling a cooling zone adjacent the fusion zone in the hearth furnace.

15. The method for producing metallic iron nodules of claim 1 where the step of assembling the hearth furnace includes a linear hearth furnace.

16. The method for producing metallic iron nodules of claim 1 where the step of assembling the hearth furnace includes a rotary hearth furnace.

17. The method for producing metallic iron nodules of claim 1 where the step of providing reducible material includes discrete portions in pre-formed briquettes or balls.

18. The method for producing metallic iron nodules of claim 1 further comprising: providing an overlayer of coarse carbonaceous material over at least a portion of the layer of reducible material prior to the step of delivering oxygen gas where the coarse carbonaceous material has an average particle size greater than an average particle size of the hearth material layer carbonaceous material.

19. The method for producing metallic iron nodules of claim 18 where the oxygen gas is delivered to the conversion zone and the fusion zone through one or more oxygen lances or oxy-burners such that the oxygen gas flow avoids impinging upon the coarse carbonaceous layer.

20. The method for producing metallic iron nodules of claim 1 further comprising: providing an overlayer of coarse carbonaceous material over at least a portion of the layer of reducible material prior to the step of delivering oxygen gas where the overlayer of coarse carbonaceous material comprises discrete particles having sizes greater than about 6 mesh.

21. The method for producing metallic iron nodules of claim 20 where the oxygen gas is delivered to the conversion zone and the fusion zone through one or more oxygen lances or oxy-burners such that the oxygen gas flow avoids impinging upon the coarse carbonaceous layer.

22. The method for producing metallic iron nodules of claim 1 where the step of providing a layer of reducible material includes a predetermined amount of iron bearing material and between about 80 percent and about 110 percent of a stoichiometric amount of reducing material necessary for complete iron reduction of the iron bearing material.

23. The method for producing metallic iron nodules of claim 1 where the step of providing a layer of reducible material includes a predetermined amount of iron bearing material and between about 70 percent and about 90 percent of a stoichiometric amount of reducing material necessary for complete iron reduction of the iron bearing material.

24. The method for producing metallic iron nodules of claim 1 further comprising:
heating the conversion zone to at a temperature sufficient to at least partially reduce the reducible material and the fusion zone to a temperature sufficient to at least partially reduce the reducible material by the combustion of at least one fuel selected from the group consisting of natural gas, methane, propane, fuel oil, and coal; and
substantially reducing or stopping supply of said fuel to the conversion and fusion zones after initiating the step of delivering oxygen gas.

25. A method for producing metallic iron nodules comprising the steps of:
assembling a hearth furnace having a moveable hearth comprising refractory material and having at least a conversion zone and a fusion zone,
providing a hearth material layer comprising at least carbonaceous material on the refractory material,
providing a layer of reducible material comprising at least reducing material and iron bearing material arranged in a plurality of discrete portions over at least a portion of the hearth material layer,
delivering oxygen gas into the hearth furnace in the conversion and fusion zones at a ratio of at least 0.7:1 pounds of oxygen to pounds of iron in the reducible material to heat the conversion zone to a temperature sufficient to at least partially reduce the reducible material and to heat the fusion zone to at least 2550° F. (about 1400° C.), and in addition to produce a stack gas having a composition of at least 20% by mass carbon dioxide; and
heating the layer of reducible material to form from the discrete portions one or more metallic iron nodules and slag.

26. The method for producing metallic iron nodules of claim 25 where delivering of oxygen gas further comprises delivering a quantity of oxygen gas into the hearth furnace in the conversion zone sufficient to heat the conversion zone to at least 2350° F. (about 1290° C.).

27. The method for producing metallic iron nodules of claim 26 where the oxygen gas is delivered to the conversion zone and the fusion zone through one or more oxygen lances, oxy-burners, or both.

28. The method for producing metallic iron nodules of claim 27 where the oxygen gas is delivered from the oxygen lances or oxy-burners from a position less than 18 inches from a top portion of the interior of the hearth furnace.

29. The method for producing metallic iron nodules of claim 25 where the iron bearing material is selected from the group consisting of mill scale, magnetite, hematite, and combinations thereof.

30. The method for producing metallic iron nodules of claim 25 where the reducing material is selected from the group consisting of anthracite coal, coke, char, bituminous coal, sub-bituminous coal, and combinations thereof.

31. A method of production of metallic iron nodules comprising the steps of:
assembling a hearth furnace having a moveable hearth comprising refractory material and having at least a conversion zone and a fusion zone,
providing a hearth material layer comprising at least carbonaceous material on the refractory material,
providing a layer of reducible material comprising at least reducing material and iron bearing material arranged in a plurality of discrete portions over at least a portion of the hearth material layer,
delivering oxygen gas and combustible gases other than air into the hearth furnace in the conversion and fusion zones to heat the conversion zone to a temperature sufficient to at least partially reduce the reducible material and to heat the fusion zone to a temperature sufficient to at least partially reduce the reducible material and in addition to produce a stack gas having a composition of at least 20% by mass carbon dioxide,
heating the layer of reducible material to form from the discrete portions one or more metallic iron nodules and slag, and
processing the stack gas to produce a gas stream having a composition of at least 90% carbon dioxide by oxidizing carbon monoxide and hydrogen, treating the gas stream to remove at least one of sulfur-containing and halogen-containing compounds, and condensing water vapor from the gas stream.

32. The method of production of metallic iron nodules of claim 31 where the delivering of oxygen gas is in a ratio of at least 0.7:1 pounds of oxygen to pounds of iron in the reducible material.

33. The method of production of metallic iron nodules of claim 31 where the delivering of oxygen gas is in a ratio of at least 0.8:1 pounds of oxygen to pounds of iron in the reducible material.

34. The method of production of metallic iron nodules of claim 31 where the delivering of oxygen gas is in a ratio is at least 0.9:1 pounds of oxygen to pounds of iron in the reducible material.

35. The method of production of metallic iron nodules of claim 31 where the delivering of oxygen gas is in a ratio is at least 1:1 pounds of oxygen to pounds of iron in the reducible material.

36. The method of production of metallic iron nodules of claim 31 where the delivering of oxygen gas is in a ratio is at least 1.2:1 pounds of oxygen to pounds of iron in the reducible material.

37. The method of production of metallic iron nodules of claim 31 where the delivering of oxygen gas is in a ratio is at least 1.5:1 pounds of oxygen to pounds of iron in the reducible material.

38. The method of production of metallic iron nodules of claim 31 where the delivering of oxygen gas is in a ratio is at least 1.7:1 pounds of oxygen to pounds of iron in the reducible material.

39. The method of production of metallic iron nodules of claim 31 where the step of delivering oxygen gas to the conversion zone and the fusion zone is through one or more oxygen lances, oxy-burners, or both.

40. The method of production of metallic iron nodules of claim 39 where the step of delivering oxygen gas is through the one or more oxygen lances or oxy-burners from a position less than 18 inches from a top portion of the hearth furnace.

41. The method of production of metallic iron nodules of claim 31 comprising the additional step of capturing the carbon dioxide gas from a the gas stream for use in a subsequent process.

42. The method of production of metallic iron nodules of claim 41 where the subsequent process is selected from a group consisting of precipitating the carbon dioxide as carbonate, compressing the carbon dioxide gas to form liquid carbon dioxide and transporting the carbon dioxide gas through a pipeline to a second location.

43. The method of production of metallic iron nodules of claim 31 where the conversion zone is heated to at least 2350° F. (about 1290° C.).

44. The method of production of metallic iron nodules of claim 31 where the fusion zone is heated to at least 2550° F. (about 1400° C.).

45. The method of production of metallic iron nodules of claim 31 where the hearth furnace has in addition a drying zone.

46. The method of production of metallic iron nodules of claim 45 where the drying zone is heated to between about 300-600° F. (about 150-315° C.).

47. The method of production of metallic iron nodules of claim 31 further comprising: assembling a cooling zone adjacent the fusion zone.

48. The method of production of metallic iron nodules of claim 31 where the hearth furnace is assembled as a linear hearth furnace.

49. The method of production of metallic iron nodules of claim 31 where the hearth furnace is assembled as a rotary hearth furnace.

50. The method of production of metallic iron nodules of claim 31 where the step of providing the layer of reducible material includes discrete portions in pre-formed briquettes or balls.

51. The method of production of metallic iron nodules of claim 31 further comprising: providing an overlayer of coarse carbonaceous material over at least a portion of the layer of reducible material before the step of delivering oxygen gas, where the coarse carbonaceous material has an average particle size greater than an average particle size of the hearth material layer carbonaceous material.

52. The method of production of metallic iron nodules of claim 31 further comprising: providing an overlayer of coarse carbonaceous material over at least a portion of the layer of reducible material before the step of delivering oxygen gas, where the overlayer of coarse carbonaceous material comprises discrete particles having sizes greater than about 6 mesh.

53. The method of production of metallic iron nodules of claim 31 where the step of providing a layer of reducible material includes a predetermined quantity of iron bearing material and between about 80 percent and about 110 percent of a stoichiometric amount of reducing material necessary for complete iron reduction of the iron bearing material.

54. The method of production of metallic iron nodules of claim 31 where the step of providing a layer of reducible material includes a predetermined amount of iron bearing material and between about 70 percent and about 90 percent of a stoichiometric amount of reducing material necessary for complete iron reduction of the iron bearing material.

* * * * *

UNITED STATES PATENT AND TRADEMARK OFFICE
CERTIFICATE OF CORRECTION

| | |
|---|---|
| PATENT NO. | : 8,790,442 B2 |
| APPLICATION NO. | : 13/499152 |
| DATED | : July 29, 2014 |
| INVENTOR(S) | : David J. Englund et al. |

It is certified that error appears in the above-identified patent and that said Letters Patent is hereby corrected as shown below:

IN THE SPECIFICATION:

Column 20, line 7, "from a position less than 18 inches from a top of the interior" should read --from a position less than 18 inches from a top portion of the interior--

Signed and Sealed this
Eighteenth Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,790,442 B2  
APPLICATION NO. : 13/499152  
DATED : July 29, 2014  
INVENTOR(S) : David J. Englund et al.

Page 1 of 1

It is certified that error appears in the above-identified patent and that said Letters Patent is hereby corrected as shown below:

In the Specification

Please replace the paragraph under the section titled "GOVERNMENT INTERESTS" and found in column 1, lines 11-14 with the following paragraph which contains the appropriate language as required by 37 CFR 401, Section 401.14(f)(4):

"This invention was made with government support under DE-FG36-05GO15185 awarded by the Department of Energy. The government has certain rights in the invention."

Signed and Sealed this
Twenty-fifth Day of August, 2015

Michelle K. Lee
*Director of the United States Patent and Trademark Office*